Nov. 19, 1935.  C. STUESSER  2,021,617
HARROW TOOTH CONTROL
Filed April 29, 1935
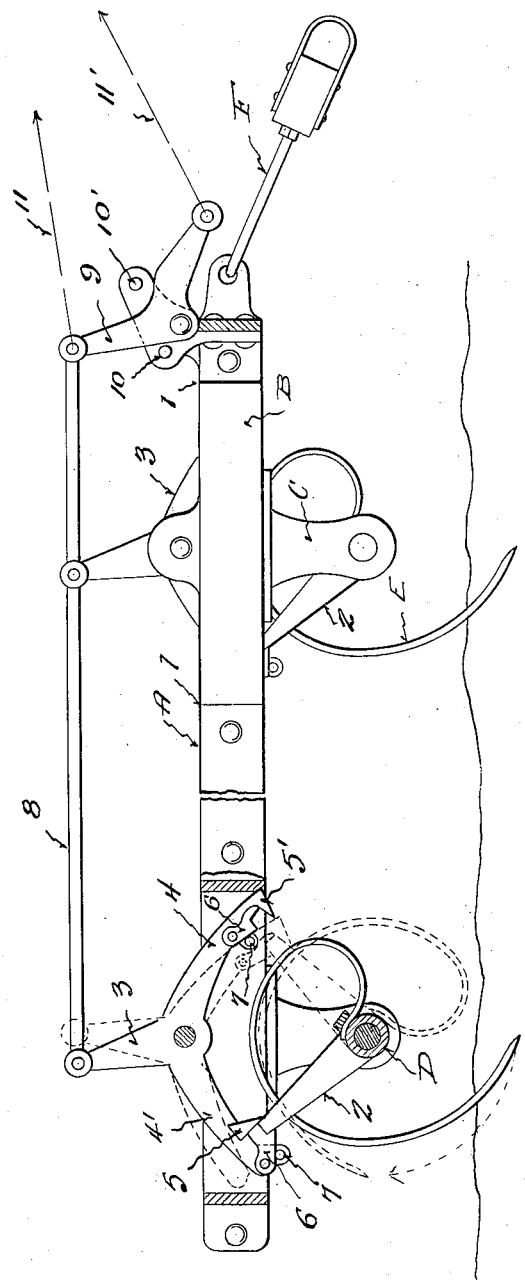
Inventor
C. Stuesser
By
Attorneys Patented Nov. 19, 1935

2,021,617

UNITED STATES PATENT OFFICE 2,021,617

HARROW TOOTH CONTROL

Christian Stuesser, Richfield, Wis.

Application April 29, 1935, Serial No. 18,709

1 Claim. (Cl. 55—34)

My invention refers to cultivators and harrows, and has for its object to provide means under manual control for automatically releasing and locking the gangs of harrow teeth from their working position to their idle position, it being understood that the harrow or cultivator is powered by a tractor, and the manual control lock and release mechanism is positioned conveniently, whereby the operator of the tractor can manipulate the same.

With the above objects in view, the invention consists in certain pecularities of construction and combination of parts, as will be fully set forth with reference to the accompanying illustrations, and subsequently claimed.

The drawing illustrates an elevation of any standard gang cultivator or harrow equipped with a tooth lock and release mechanism embodying the features of my invention, parts being broken away and in section to more clearly illustrate structural features.

Referring by characters to the drawing, A represents any standard skeleton frame, B a strap portion having depending bearings C into which bearings are mounted rotatory shafts D, which shafts carry standard spring harrow teeth E, all of these parts being of ordinary construction, it being understood that the harrow frame is provided with a draft bar F, which is linked to the frame.

The strap frame B may be formed by two layers which are riveted or otherwise secured together and are bowed apart at the points 1 to form slots into which the ends of rock-arms 2 are adapted to oscillate. The rock-arms 2 are secured to the teeth-carrying shafts D. As illustrated in full lines in the drawing, said rock-arms are locked in a rearward position, whereby the spring harrow teeth are held in their working position with relation to the ground, for cultivating and harrowing.

Each rock-arm is locked in its working position by an escapement lever 3, which is pivoted to the frame strap B. The escapement lever has front and rear arms 4—4' extending therefrom, and the said arms are formed with fixed stop lugs 5—5'. Each arm also has pivoted thereto a gravity dog 6, drop movement of which is limited by a pin 7. Thus, it will be seen that the arms 2 are locked against forward movement by the stop lugs 5—5', and rearwardly by the gravity locking dogs 7.

The upwardly extended arms of the escapement levers 3 are connected by a link 8, and in this exemplification of my invention the link, at its forward end, is pivoted to one arm of a bellcrank lever 9, which lever is pivotally connected to the frame, and movement of this lever is limited in its rearward direction by a pin 10, and in its forward direction by a pin 10'.

The arms of the bell-crank lever 9 are illustrated as having flexible connections 11 and 11', which lead to a convenient position near the tractor driver's seat, whereby said runners or cables can be manipulated to positively rock the escapement levers in either forward or backward position, whereby the locking arms 2 are released.

It is manifest that the means illustrated for actuating the escapement lever from the tractor is immaterial as to details, as, for example, as a substitute for the two cords or runners 11 and 11' I may employ a rod, whereby a push and pull movement will result, or I may utilize a spring in connection with this mechanism for drawing the escapement levers in one direction, and a pull mechanism for drawing the same in the opposite direction, it being understood that in this instance when the pull is employed against the spring for manipulating the escapement levers, a simple lock connection with the pull movement is provided.

From the foregoing description it is apparent that when the harrow is working in the soil with the teeth in the working position indicated in full lines, should the operator desire to shift the harrow teeth from this working position to an idle position, all that would be required is that he exert a pull upon the cord or runner 11.

This action will cause the escapement lever to rock forward, whereby the gravity dog 6 and juxtaposed stop lug 5 will be lifted from locking engagement with the end of the lever 2. Simultaneous with this movement of the escapement lever, the forward arm 4 thereof will be moved downwardly, whereby its stop lug 5' will be positioned in the path of travel of the arm 2.

Now, owing to the ground engagement of the harrow teeth as said harrow travels forward, the teeth will immediately rotate in a forward direction, causing initially the ends of said teeth to be retracted from the soil, and said teeth will then rotate by momentum to the position indicated in dotted lines, in which position the teeth will have made a partial rotation and are locked in this idle position between the gravity dog 6 and stop lug 5', it being understood that the gravity dog is lifted by the end of the arm as it travels to its locked idle position.

In the above idle position, as indicated by dotted lines, the preponderance of weight of the gangs of the harrow teeth will lie over the center of gravity, and hence when it is desired to again drop said harrow teeth into a working position, the escapement levers being actuated reversely will cause the arms 2 to be freed, whereby the harrow teeth will continue their rotary forward movement and complete a circle in this direction, at which time the ends of said teeth will engage the ground and dig in due to the travel of the harrow.

While this action of complete rotation in a forward direction by the harrow teeth may be accomplished by ground traction and gravity, as just described, it is obvious that some form of weight or spring may be employed to accomplish this same general result without departing from the spirit of my invention.

Furthermore, it is obvious that while I have illustrated and described in minute detail one mechanism for accomplishing the desired result of locking and releasing the gangs of harrow teeth in their working and idle positions, I may, without departing from the spirit of my invention, vary such details indefinitely within the scope of the claim.

In completing the rotary movement of the teeth from working position to idle position, I employ an arm which may be adjustable as to depth. Hence, when the teeth are tripped, the arms immediately dig into the soft ground and aid in rotating the teeth from working position to idle position.

I claim:

In a harrow having a frame, a strap carried thereby, a shaft rotatably mounted on the frame having a gang of harrow teeth fixed thereto, the combination of a lock and release mechanism for raising and lowering the gang of harrow teeth in working and idle positions, comprising a rock-arm secured to the shaft, an escapement lever pivoted to the frame strap above said shaft having spaced stop lugs adapted to limit movement of the rock-arm, yieldable dogs associated with each stop lug for locking said rock-arm against said stop lug, and means for manually shifting the escapement lever, whereby said rock-arm is released to permit the harrow teeth to oscillate from a working position to an idle position incidental to travel of the harrow, and by gravity from idle position to working position.

CHRISTIAN STUESSER.